United States Patent
Iwamoto et al.

(10) Patent No.: US 8,531,636 B2
(45) Date of Patent: Sep. 10, 2013

(54) LIQUID CRYSTAL DISPLAY

(75) Inventors: Yoshihisa Iwamoto, Tokyo (JP); Kunihiko Katano, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 183 days.

(21) Appl. No.: 13/239,831

(22) Filed: Sep. 22, 2011

(65) Prior Publication Data

US 2012/0075561 A1 Mar. 29, 2012

(30) Foreign Application Priority Data

Sep. 27, 2010 (JP) ................... 2010-215561

(51) Int. Cl.
*G02F 1/1337* (2006.01)
*G02F 1/141* (2006.01)

(52) U.S. Cl.
USPC ............ 349/132; 349/133; 349/134; 349/130

(58) Field of Classification Search
USPC .................. 349/132, 133, 134, 130
See application file for complete search history.

(56) References Cited

U.S. PATENT DOCUMENTS

| | | | |
|---|---|---|---|
| 5,309,264 A * | 5/1994 | Lien et al. | 349/143 |
| 6,300,996 B1 * | 10/2001 | Matsuyama et al. | 349/144 |
| 6,449,025 B2 * | 9/2002 | Lee | 349/129 |
| 6,462,798 B1 * | 10/2002 | Kim et al. | 349/129 |
| 2008/0278643 A1 * | 11/2008 | Iwamoto | 349/36 |

FOREIGN PATENT DOCUMENTS

| | | |
|---|---|---|
| JP | 11-344710 A | 12/1999 |
| JP | 2000-193980 A | 7/2000 |
| JP | 2005-234254 A | 9/2005 |
| JP | 2008-281752 A | 11/2008 |
| JP | 2009-080197 A | 4/2009 |

* cited by examiner

*Primary Examiner* — Mike Qi
(74) *Attorney, Agent, or Firm* — Holtz, Holtz, Goodman & Chick, PC

(57) ABSTRACT

A liquid crystal display includes a first substrate having a first electrode on one surface side, a second substrate having second electrode on one surface side and placed opposite to the first substrate. A liquid crystal layer having a pretilt angle of 89.7° or more and less than 90° is disposed between the first and second electrodes. The first and second electrodes respectively form a pixel in opposing areas. The first electrode includes rectangularly shaped openings disposed with regularity in the pixel in a planar view. The openings include first and second openings with longitudinal directions respectively facing first and second directions, the second direction different from the first direction. The angle formed by the longitudinal directions of the first and second openings, and an alignment direction of liquid crystal molecules at the substantial center of the liquid crystal layer is 0° or more and less than 90°.

8 Claims, 10 Drawing Sheets

| Pv | frame frequency Hz |
|---|---|
| 0.036 | 95 |
| 0.053 | 70 |
| 0.071 | 110 |

| Pv | L | frame frequency Hz |
|---|---|---|
| 0.053 | 0.065 | 145 |
| 0.071 | 0.09 | 140 |
| 0.106 | 0.14 | 150 |

| P | L | Frame frequency of the segment display-type liquid crystal display device | | | | Frame frequency of the dot matrix-type liquid crystal display device | | | |
|---|---|---|---|---|---|---|---|---|---|
| | | 1/7 bias | | 1/9 bias | | 1/7 bias | | 1/9 bias | |
| | | 89.7° | 89.9° | 89.7° | 89.9° | 89.7° | 89.9° | 89.7° | 89.9° |
| 0.1 | 0.0628 | 140 | 160 | 140 | 180 | 100 | 120 | 105 | 135 |
| 0.2 | 0.137 | 90 | 210 | 130 | 190 | 115 | 140 | 120 | 150 |

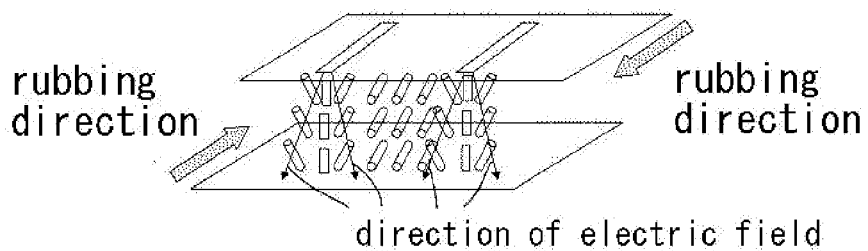
Fig. 13A
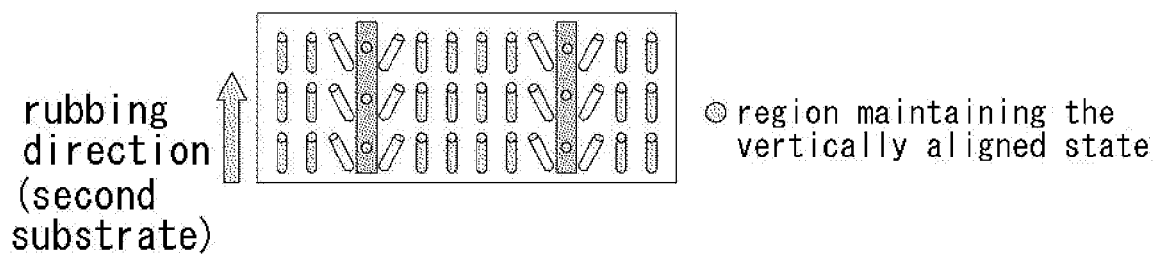
Fig. 13B
Fig. 14
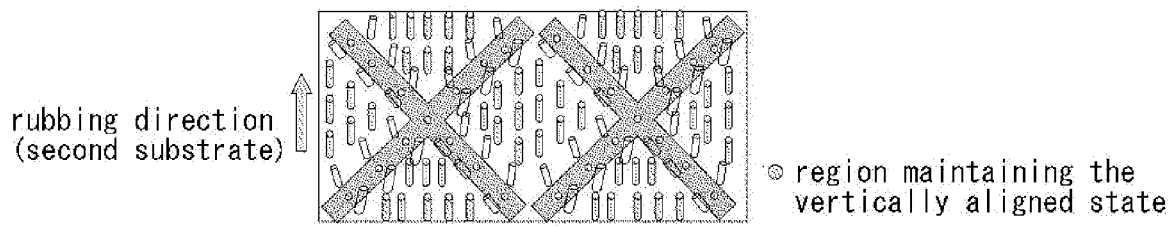

LIQUID CRYSTAL DISPLAY

BACKGROUND OF THE INVENTION

1. Field of the Invention

The present invention relates to a vertical alignment liquid crystal display device which is driven by multiplex driving.

2. Description of the Background Art

A liquid crystal display device is broadly used as an information display unit in various electronic devices for consumer or automobile use. In General, a liquid crystal display device is configured by disposing a liquid crystal layer made of a liquid crystal material between two substrates that are placed opposite each other with a gap of roughly several micrometers. As one type of this kind of liquid crystal display device, a vertical alignment liquid crystal display device is known. A vertical alignment liquid crystal display device comprises, as its main components, liquid crystal cells of a VA mode in which liquid crystal molecules are aligned substantially vertically relative to the surface of the respective substrates within the liquid crystal layer that are disposed between the two substrates, and polarizers that are respectively provided to the outside of the liquid crystal cells. The respective polarizers are often provided in a cross-Nicol arrangement. Based on the foregoing arrangement, since the transmittance of the liquid crystal display device during the non-application of voltage will be extremely low, it is possible to realize a high contrast relatively easily.

In order to realize the liquid crystal cells of a VA mode, it is important to control the alignment of the liquid crystal molecules of the liquid crystal layer by performing predetermined alignment treatment to the substrate surface. As for the alignment treatment, for example, treatment (so-called oblique deposition) of forming a thin film having a sawtooth surface on the substrate surface by evaporating metal oxides such as SiOx from a direction that is inclined from the normal line of the substrate, treatment (so-called photo alignment, treatment) of depositing an organic alignment film material such as polyimide on the substrate surface and thereafter irradiating ultraviolet rays from a specific direction, and alignment treatment of forming a vertical alignment film, which has specific surface free energy, on the substrate surface, and performing rubbing treatment thereto are generally known. According to the foregoing alignment treatments, it is possible to obtain an alignment (so-called mono-domain alignment) in which the liquid crystal molecules in the liquid crystal layer are aligned in a single direction during the non-application of voltage.

In the vertical alignment liquid crystal display device having a mono-domain alignment as described above, the setting of a pretilt angle in the liquid crystal layer considerably affects the display characteristics. Specifically, upon considering the steepness in the electro-optical characteristics, the optimal state will be when the liquid crystal molecules are aligned perfectly vertical on the substrate during the non-application of voltage; that is, when the pretilt angle is 90°. In particular, when driving the liquid crystal display device according to the multiplex driving method, an effective means for increasing the display capacity (that is, increasing the duty) is to set the pretilt angle to a greater angle. Nevertheless, since it is not possible to obtain the uniformity of the alignment of the liquid crystal molecules during the application of voltage if the pretilt angle is set to 90°, in a practical sense, it is necessary to perform the foregoing alignment treatment.

Japanese Unexamined Patent Application Publication No. 2005-234254 (Patent Document 1) describes that, in a vertical alignment liquid crystal display device, if the pretilt angle is set to be greater than 89.5° (particularly greater than 89.7°), the maximum transmittance tends to drop as a result of following the size of the pretilt angle. Moreover, with respect to this point, Japanese Unexamined Patent Application Publication No. 2008-281752 (Patent Document 2) describes that one reason thereof is that a dark region appears at a part of the display part under driving conditions where the frame frequency is relatively low, and the display consequently becomes non-uniform. As a method of resolving the foregoing display non-uniformity, foregoing Patent Document 2 discloses the setting of the pretilt angle of the vertical alignment liquid crystal display device and the method of setting the frame frequency in accordance therewith in connection with the respective cases of using various multiplex driving waveforms. Specifically, Patent Document 2 describes that the uniformity of display can be achieved by increasing the frame frequency as the pretilt angle approaches 90°, or using a ½ line inverted drive waveform including numerous high frequency components.

Meanwhile, upon applying the technology disclosed in foregoing Patent Document 2 to a case of driving a vertical alignment liquid crystal display device, which has a relatively large number of scanning lines (that is, large duty), by multiplex driving, the drive current needs to be increased since the internal impedance of the liquid crystal display device will decrease. If the required drive current exceeds the current capability of the driver (driving device) for driving the liquid crystal display device, a voltage drop will occur in the course of scanning the transparent electrodes which serve as the scanning line, and, therefore, the applied voltage to the respective pixels will not become uniform, and the display non-uniformity will become conspicuous. For example, with a dot matrix-type liquid crystal display device in which stripe-shaped transparent electrodes are crisscrossed and a liquid crystal layer is provided therebetween, streaky display non-uniformity along the extending direction of one transparent electrode may occur, or variation in the brightness or contrast along the extending direction of the other transparent electrode may occur. In order to eliminate this kind of display non-uniformity, it is effective to increase the current capability of the driver, lower the frame frequency, or use a drive waveform (frame inverted waveform) that does not contain numerous high frequency components. Nevertheless, increasing the current capability of the driver will lead to increased costs, and it is not necessarily a preferable solution.

SUMMARY OF THE INVENTION

An object of a specific mode of the present invention is to provide technology capable of lowering the frame frequency while maintaining the display uniformity in the case of driving a vertical alignment liquid crystal display device by multiplex driving under a condition where the pretilt angle is close to 90°.

In order to achieve the foregoing object, the present inventors conducted intense study regarding the display non-uniformity that occurs in the case of driving a vertical alignment liquid crystal display device by multiplex driving under a condition where the pretilt angle is close to 90°. FIG. 15 shows an appearance observational photograph in the case of driving a vertical alignment liquid crystal display device having a pretilt angle of 89.6° by multiplex driving under the following conditions: namely; duty ratio of 1/8, bias ratio of 1/5, and frame frequency of 80 Hz. As shown in the diagram, a liquid crystal display device having a segment-type display unit was used and all segments were turned on for display (bright display state). The rubbing direction of this liquid crystal display device is the 12 o'clock direction and the 6 o'clock direction (anti-parallel), and the alignment direction of the liquid crystal molecules at the center of the liquid crystal layer is the 12 o'clock direction (direction shown with the arrow in the diagram). As shown in the diagram, dark regions partially appear in the respective segments, and the display uniformity is lost. Upon observing this in detail, portions where the dark region appears have certain characteristics. Specifically, the location where the dark region occurs often in the respective segments is near the edge of the three segments having long sides in a substantially orthogonal direction relative to the rubbing direction. These dark regions can be eliminated by increasing the frame frequency, but this is contradictory to the demands of lowering the frame frequency. Based on the foregoing observation, it is considered that the generated state of the oblique electric field near the edge of the electrodes, and the rubbing direction; that is, the alignment direction of the liquid crystal molecules at the center of the liquid crystal layer are related to the occurrence of dark regions that deteriorate the display uniformity. Thus, the present inventors devised the following inventions based on the foregoing observational results.

The liquid crystal display device according to an aspect of the present invention comprises (a) a first substrate including a first electrode on one surface side, (b) a second substrate including a second electrode on one surface side and placed opposite to the first substrate, and (c) a liquid crystal layer having a pretilt angle set to 89.7° or more and less than 90°, and disposed between the first electrode of the first substrate and the second electrode of the second substrate, (d) wherein the first electrode and the second electrode respectively form a pixel in opposing areas, (e) wherein the first electrode includes a plurality of openings of a rectangular shape disposed with regularity in the pixel in a planar view, (f) wherein the plurality of openings include a first opening in which its longitudinal direction faces a first direction, and a second opening in which its longitudinal direction faces a second direction that is different from the first direction, and (g) wherein an angle formed by the respective longitudinal directions of the first opening and the second opening, and an alignment direction of liquid crystal molecules at the substantial center of the liquid crystal layer is 0° or more and less than 90°.

According to the above-mentioned liquid crystal display device, it is possible to lower the frame frequency while maintaining the display uniformity in the case of driving a vertical alignment liquid crystal display device by multiplex driving under a condition where the pretilt angle is close to 90°.

In the foregoing liquid crystal display device, the angle formed by the respective longitudinal directions of the first opening and the second opening, and the alignment direction of liquid crystal molecules at the substantial center of the liquid crystal layer is preferably as close to 0° as possible, and, for example, is preferably substantially 45° or substantially 0°.

It is thereby possible to increase the effect of lowering the frame frequency. Moreover, as a result of setting the angle to 0° or 45°, this is also preferable from the perspective of positional relationship with the absorption axis when providing polarizers to the outside of the first substrate and the second substrate, respectively.

According to the above-mentioned liquid crystal display device, the plurality of openings may further include a third opening in which its longitudinal direction faces a third direction that is different, from both the first direction and the second direction. In this case, an angle formed by the longitudinal direction of the third opening, and an alignment direction of liquid crystal molecules at the substantial center of the liquid crystal layer is 0° or more and less than 90°.

According to the above-mentioned liquid crystal display device, it is also possible to lower the frame frequency while maintaining the display uniformity in the case of driving a vertical alignment liquid crystal display device by multiplex driving under a condition where the pretilt angle is close to 90°.

In the foregoing liquid crystal display device, the liquid crystal layer may be added with a chiral material that will cause a twisted structure of the liquid crystal molecules when voltage is applied to the liquid crystal layer.

According to the above-mentioned invention, the aligned state of the liquid crystal layer becomes more uniform and the alignment uniformity can be improved.

The liquid crystal display device according to another aspect of the present invention comprises (a) a first substrate including a first electrode on one surface side, (b) a second substrate including a second electrode on one surface side and placed opposite to the first substrate, and (c) a liquid crystal layer having a pretilt angle set to 89.7° or more and less than 90°, and disposed between the first electrode of the first substrate and the second electrode of the second substrate, (d) wherein the first electrode and the second electrode respectively form a pixel in opposing areas, (e) wherein the first electrode includes a plurality of openings disposed with regularity in the pixel in a planar view, (f) wherein each of the plurality of openings has a cross-shaped outer edge including a rectangular first portion in which its longitudinal dire ion faces a first direction, and a rectangular second portion in which its longitudinal direction faces a second direction that is different from the first direction, and (g) wherein an angle formed by the respective longitudinal directions of the first portion and the second portion, and an alignment direction of liquid crystal molecules at the substantial center of the liquid crystal layer is 0° or more and less than 90°.

According to the above-mentioned liquid crystal display device, it is also possible to lower the frame frequency while maintaining the display uniformity in the case of driving a vertical alignment liquid crystal display device by multiplex driving under a condition where the pretilt angle is close to 90°.

In the foregoing liquid crystal display device, with each of the plurality of openings, preferably, the angle formed by the longitudinal directions of the first portion and the second portion is substantially 90°. Also, preferably, the angle formed by the respective longitudinal directions of the first portion and the second portion, and the alignment direction of liquid crystal molecules at the substantial center of the liquid crystal layer is substantially 45°.

It is thereby possible to increase the effect of lowering the frame frequency. Moreover, this is also preferable from the perspective of positional relationship with the absorption axis when providing polarizers to the outside of the first substrate and the second substrate, respectively.

In the foregoing liquid crystal display device, the liquid crystal layer may be added with a chiral material that will cause a twisted structure of the liquid crystal molecules when voltage is applied to the liquid crystal layer.

According to the above-mentioned invention, the aligned state of the liquid crystal layer becomes more uniform and the alignment uniformity can be improved.

The liquid crystal display device according to another aspect of the present invention comprises (a) a first substrate including a first electrode on one surface side, (b) a second substrate including a second electrode on one surface side and placed opposite to the first substrate, and (c) a liquid crystal layer having a pretilt angle set to 89.7° or more and less than 90°, and disposed between the first electrode of the first substrate and the second electrode of the second substrate, (d) wherein the first electrode and the second electrode respectively form a pixel in opposing areas, (e) wherein the first electrode includes a plurality of openings disposed with regularity in the pixel in a planar view, (f) wherein each of the plurality of openings has a Y-shaped outer edge including a rectangular first portion in which its longitudinal direction faces a first direction, a rectangular second portion in which its longitudinal direction faces a second direction that is different from the first direction, and a rectangular third portion in which its longitudinal direction faces a third direction that is different from both the first direction and the second direction, and (g) wherein an angle formed by the respective longitudinal directions of the first portion, the second portion and the third portion, and an alignment direction of liquid crystal molecules at the substantial center of the liquid crystal layer is 0° or more and less than 90°.

According to the above-mentioned liquid crystal display device, it is also possible to lower the frame frequency while maintaining the display uniformity in the case of driving a vertical alignment liquid crystal display device by multiplex driving under a condition where the pretilt angle is close to 90°.

In the foregoing liquid crystal display device, with each of the plurality of openings, preferably, the angle formed by the respective longitudinal directions of the first portion and the second portion, the second portion and the third portion, and the first portion and the third portion is substantially 120°.

It is thereby possible to increase the effect of lowering the frame frequency.

In the foregoing liquid crystal display device, the liquid crystal layer may be added with a chiral material that will cause a twisted structure of the liquid crystal molecules when voltage is applied to the liquid crystal layer.

According to the above-described invention, the aligned state of the liquid crystal layer becomes more uniform and the alignment uniformity can be improved.

BRIEF DESCRIPTION OF THE DRAWINGS

FIG. 5 is another schematic plan view explaining the structure of the respective openings provided to the first electrode.

FIG. 13A and FIG. 13B are schematic views showing the state where an non-uniform alignment region is blocked from its periphery and being prevented from propagating to the outside.

FIG. 14 is also a schematic view showing the state where an non-uniform alignment region is blocked from its periphery and being prevented from propagating to the outside.

DESCRIPTION OF THE PREFERRED EMBODIMENTS

Embodiments of the present invention are now explained with reference to the appended drawings.

Figure 1:
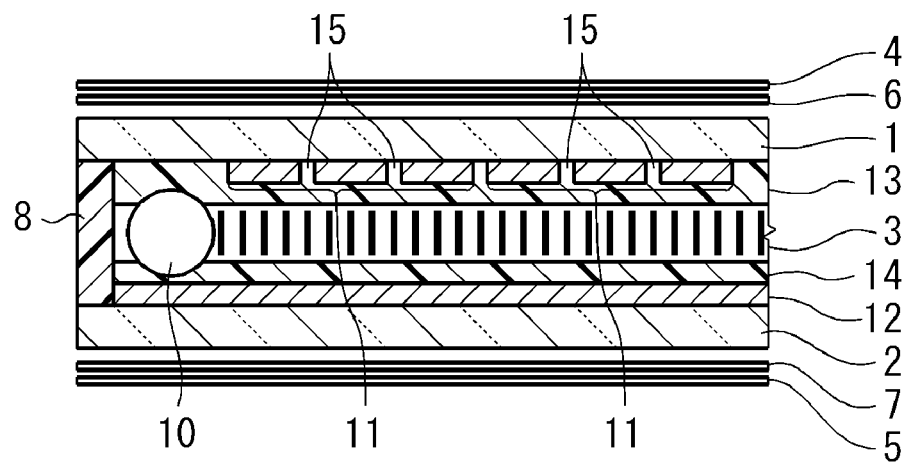
FIG. 1 is a schematic cross section showing the structure of the liquid crystal display device according to one embodiment of the present invention.

FIG. 1 is a schematic cross section showing the structure of the liquid crystal display device according to one embodiment, of the present invention. The liquid crystal display device of this embodiment shown in FIG. 1 mainly comprises a first substrate 1 and a second substrate 2 placed opposite each other and a liquid crystal layer 3 provided between both substrates. A first polarizer 4 is disposed outside the first substrate 1, and a second polarizer 5 is disposed outside the second substrate 2. A first viewing angle compensator 6 is disposed between the first substrate 1 and the first polarizer 4, and a second viewing angle compensator 7 is disposed between the second substrate 2 and the second polarizer 5. The periphery of the liquid crystal layer 3 is sealed with a sealant 8. The structure of the liquid crystal display device is now explained in further detail.

The first substrate 1 and the second substrate 2 are respectively, for example, transparent substrates such as glass substrates or plastic substrates. Spacers (sphere materials) 10 are dispersed and disposed between the first substrate 1 and the second substrate 2. As a result of these spacers 10, the gap between the first substrate 1 and the second substrate 2 is maintained at a predetermined distance (in this embodiment, approximately 3.6 to 4.0 micrometers).

The liquid crystal layer 3 is provided mutually between the first electrode 11 of the first substrate 1 and the second electrode 12 of the second substrate 2. In this embodiment, the liquid crystal layer 3 is configured by using a liquid crystal material (nematic liquid crystal material) in which the dielectric anisotropy $\Delta\varepsilon$ (delta epsilon) is negative ($\Delta\varepsilon$ (delta epsilon)<0). Bold lines illustrated in the liquid crystal layer 3 schematically show the alignment direction of the liquid crystal molecules during the non-application of voltage. As shown in the diagram, with the liquid crystal display device of this embodiment, the aligned state of the liquid crystal molecules of the liquid crystal layer 3 is oriented by a monodomain alignment. The pretilt angle of the liquid crystal layer 3 in this embodiment is generally set to 89.7° to 89.9°. Moreover, retardation of the liquid crystal layer 3 is approximately 800 to 870 nm (nanometer).

The first electrode 11 is provided on one surface of the first substrate 1. In this embodiment, a plurality of first electrodes 11 are respectively placed opposite to the second electrode 12. The shape of each first electrode 11 is, for example, a rectangular shape (in the case of a dot matrix-type), or a shape according to an arbitrary display pattern (in the case of a segment display-type). Each first electrode 11 is configured, for example, by patterning a transparent conductive film made of indium tin oxide (ITO) or the like as needed. Moreover, a plurality of openings (slits) 15 are provided to each of the first electrodes 11. Details regarding the respective openings 15 will be described later.

The second electrode 12 is provided on one surface of the second substrate 2. The second electrode 12 is configured, for example, by patterning a transparent conductive film made of indium tin oxide (ITO) or the like as needed. With the liquid crystal display device of this embodiment, the respective overlapping portions of the first electrode 11 and the second electrode 12 in a planar view become the display part (or pixel).

An alignment film 13 is provided to one surface side of the first substrate 1 so as to cover the first electrode 11. Similarly an alignment film 14 is provided to one surface side of the second substrate 2 so as to cover the second electrode 12. In this embodiment, as the alignment film 13 and the alignment film 14, used is a film (vertical alignment film) for controlling the aligned state of the liquid crystal layer 3 in its initial state (during non-application of voltage) to a vertically aligned state. More specifically, as the respective alignment films 13, 14, used is a film that is capable of forming a pretilt angle that is extremely close to 90° relative to the liquid crystal molecules of the liquid crystal layer 3.

FIG. 2A to FIG. 2D are schematic plan views explaining the structure of the respective openings provided to the first electrode. The openings 15 shown in FIG. 2A and FIG. 2B have a rectangular outer edge in which their respective long sides (longitudinal directions) extend in either of two directions, and are disposed with regularity in a planar view. Moreover, the respective openings 15 shown in FIG. 2C and FIG. 2D have a cross-shaped outer edge in which two rectangular openings are crisscrossed, and are disposed regularity in a planar view. In each of the diagrams of FIG. 2A to FIG. 2D, P shows the mutual distance (arrangement pitch) of the openings that are adjacent in the vertical/horizontal direction of the center of gravity of the openings. Pv and Ph show the mutual distance (arrangement pitch) of the openings that are adjacent in the vertical direction and horizontal direction of the center of gravity of the respective openings 15. Moreover, L shows the long side length of the opening 15, S shows the short side length of the opening 15, and Ls shows the mutual distance in the long side direction of the respective adjacent openings 15.

Figure 2A:
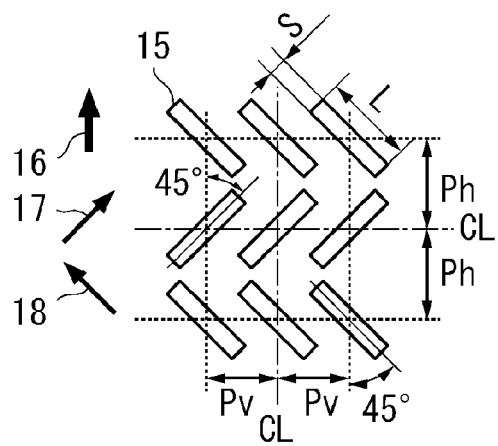
FIG. 2A to FIG. 2D are schematic plan views explaining the structure of the respective openings provided to the first electrode.

The plurality of openings 15 shown in FIG. 2A include an opening (first opening) in which its longitudinal direction faces a first direction 17, and an opening (second opening) in which its longitudinal direction faces a second direction 18. The openings 15 that are adjacent in the horizontal direction in the diagrams are arranged by aligning their respective longitudinal directions. Moreover, the openings 15 that are adjacent in the vertical direction in the diagrams are arranged by alternating their respective longitudinal directions. The respective openings 15 in the illustrated example are arranged so that the angle formed by the respective longitudinal directions and the alignment, direction 16 of the liquid crystal molecules at the substantial center of the liquid crystal layer 3 becomes substantially +45° or substantially −45°.

Figure 2B:
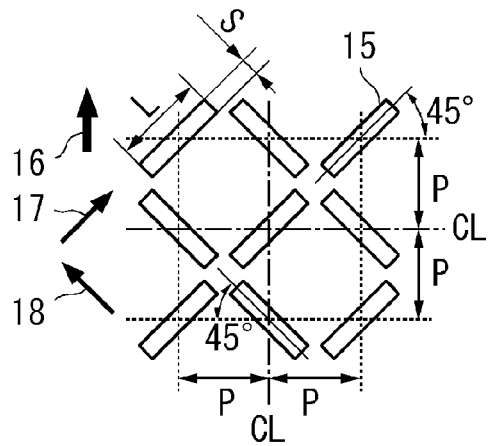

The respective openings 15 shown in FIG. 2B include an opening (first opening) in which its longitudinal direction faces a first direction 17, and an opening (second opening) in which its longitudinal direction faces a second direction 18. The respective openings 15 that are adjacent in the vertical direction or the horizontal direction in the diagrams are arranged by alternating their respective longitudinal directions. Moreover, the respective openings 15 in the illustrated example are arranged so that the angle formed by the respective longitudinal directions and the alignment direction 16 of the liquid crystal molecules at the substantial center of the liquid crystal layer 3 becomes substantially +45° or substantially −45°.

Figure 2C:
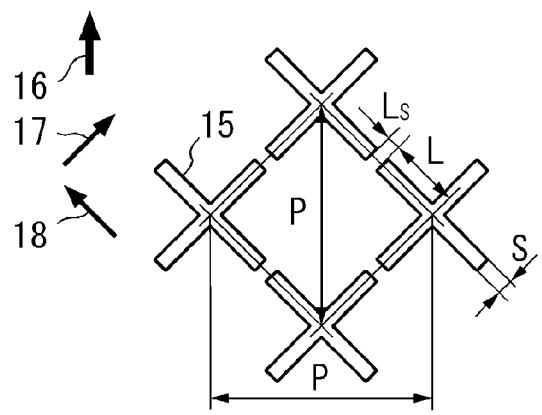

The respective openings 15 shown in FIG. 2C have a cross-shaped outer edge that is configured by crisscrossing a rectangular first portion in which its longitudinal direction faces a first direction 17 and a rectangular second portion in which is longitudinal direction faces a second direction 18. With the respective openings 15, the angle formed by the longitudinal direction of the first portion and the longitudinal direction is set to be substantially 90°. Moreover, the respective openings 15 are arranged such that the respective longitudinal directions of the first portion and the second portion will both intersect at an angle of substantially 45° relative to the alignment direction 16 of the liquid crystal molecules at the approximate center of the liquid crystal layer 3. In addition, with the respective openings 15, the respective positions of the center of gravity thereof are arranged in a checkered pattern relative to the respective directions of the vertical direction and horizontal direction.

Figure 2D:
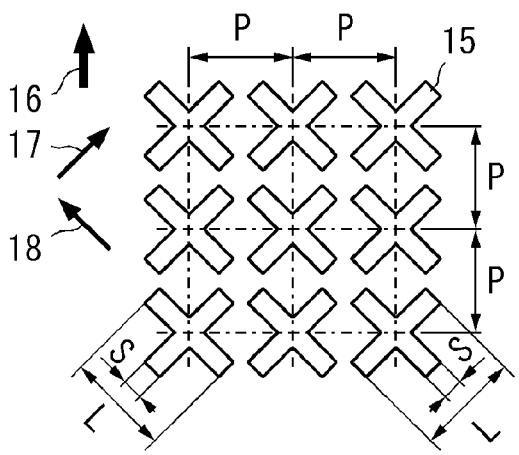

The respective openings 15 shown in FIG. 2D have a cross-shaped outer edge that is configured by crisscrossing a rectangular first portion in which its longitudinal direction faces a first direction 17 and a rectangular second portion in which is longitudinal direction faces a second direction 18. With the respective openings 15, the angle formed by the longitudinal direction of the first portion and the longitudinal direction is set to be substantially 90°. Moreover, the respective openings 15 are arranged such that the respective longitudinal directions of the first portion and the second portion will both intersect at an angle of substantially 45° relative to the alignment direction 16 of the liquid crystal molecules at substantially center of the liquid crystal layer 3. In addition, with the respective openings 15, the respective positions of the center of gravity thereof are arranged parallel relative to the respective directions of the vertical direction and horizontal direction.

Note that there are cases where the respective openings 15 shown in FIG. 2A to FIG. 2D are subject to a phenomenon in which the corners of the rectangles are rounded due to the conditions (etching conditions and the like) of the actual patterning of the electrodes. Nevertheless, according to the present inventors, it has been confirmed that there is no difference in the various characteristics between the cases where the corners of the respective opening 15 are rounded, and cases where the corners of the respective openings 15 are of a sharp shape as in the illustrated examples.

An example of the method of manufacturing a liquid crystal display device is now explained in detail.

Foremost, a substrate having a transparent electrode on one surface is prepared. As the substrate, for example, a glass substrate in which one surface is polished and coated by $SiO_2$ on that surface, and a transparent conductive film made of ITO (indium tin oxide) deposited thereon can be used. As a result of performing the well-known photolithography and etching process to the substrate, a first substrate 1 including a first electrode 11 and a second substrate 2 including a second electrode 12 are respectively formed. Note that, as needed, an insulating layer made of $SiO_2$ can be additionally formed on a part of the surface of the first electrode 11 or the second electrode 12.

Subsequently, an alignment film 13 is formed on one surface of the first substrate 1, and an alignment film 14 is formed on one surface of the second substrate 2. Specifically, after washing the respective substrates with an alkali solution, the material solution of the vertical alignment film is applied on one surface of the first substrate 1 and one surface of the second substrate 2, respectively, by using flexographic printing or other methods, and these substrates are baked in a clean oven (for example, at 180° centigrade for 30 minutes). Rubbing treatment is thereafter performed to the respective alignment films 13, 14.

As a result of appropriately setting the conditions of the rubbing treatment in this process, the pretilt angle of the liquid crystal layer 3 can be controlled. The term "pretilt angle" as used herein refers to the angle that is formed by the substrate surface and the average alignment direction (director) of the liquid crystal layer. Moreover, as a result of appropriately setting the rubbing direction (direction of moving the rubbing cloth while rotating the same) upon treatment of the rubbing to the first substrate 1, the positional relationship (refer to FIG. 2A to FIG. 2D) of the alignment direction 16 of the liquid crystal molecules at the substantial center of the liquid crystal layer 3 and the longitudinal direction of the respective openings 15 can be defined. Note that the method of alignment, treatment is not limited to rubbing treatment, and other methods (for instance, photo alignment) may also be used.

Subsequently, a sealant 8 is formed on one of the substrates (for example, on one surface of the first, substrate 1). The sealant 8 is formed by applying a material, in which rod-shaped glass spacers having a diameter size of approximately 4 micrometers are mixed therein, by using screen printing or other methods. Moreover, spacers 10 having a diameter of approximately 4 micrometers are dispersed on the other substrate (for example, on one surface of the second substrate 2). Spacer 10 is dispersed, for example, by using the dry dispersion method.

Subsequently, the first substrate 1 and the second substrate 2 are assembled so that one surface of the first substrate 1 and one surface of the second substrate 2 face each other and the rubbing direction of the respective alignment films 13, 14 becomes anti-parallel, and baked under given pressurization. The sealant 8 is consequently cured, and the first substrate 1 and the second substrate 2 are bonded (an empty cell is completed).

Subsequently, a liquid crystal material (dielectric anisotropy $\Delta \in$ (delta epsilon)<0) is injected between the first substrate 1 and the second substrate 2 by using the vacuum injection method or other methods, and, after sealing the inlet that was used for the injection, this is baked (for example, at 120° centigrade for 60 minutes). The liquid crystal layer 3 is thereby formed.

Thereafter, a first polarizer 4 and a first viewing angle compensator 6 are laminated outside the first substrate 1, and a second polarizer 5 and a second viewing angle compensator 7 are laminated outside the second substrate 2. The first polarizer 4 and the second polarizer 5 respectively have, for example, an angle of substantially 45° relative to the alignment direction 16 of the liquid crystal molecules at the substantial center of the liquid crystal layer 3, and are arranged so that they mutually become a cross-Nicol arrangement. Moreover, since the first viewing angle compensator 6 and the second viewing angle compensator 7 are provided as needed, and may be omitted. Finally, as a result of appropriately mounting a lead frame or the like, the liquid crystal display device shown in FIG. 1 is completed.

The effects that, are obtained by providing the respective openings 15 are now explained with reference to some examples.

Example 1

Prepared was a segment display-type liquid crystal display device in which the first electrode 11 and the second electrode 12 in the liquid crystal display device shown in FIG. 1 were structured for performing segment display including a plurality of arbitrary shapes such as text, seven segments, and design shapes. Note that the first electrode 11 corresponds to a common electrode, and the second electrode 11 corresponds to a segment electrode.

In Example 1, the respective openings 15 shown in foregoing FIG. 2A or FIG. 2B were provided to the first electrode 11 (common electrode) within the pixel. Note that the respective openings 15 can also be provided to the second electrode 12 (segment electrode). Moreover, if there are a plurality of segment display parts, it is not necessary to provide the respective openings 15 to one electrode in all of the respective segment display parts. Specifically whether to provide the respective openings 15 to the first electrode 11 or the second electrode 12 may differ depending on the respective segment display parts. However, within one segment display part, the respective openings 15 are preferably provided to only one electrode.

The size of the openings of the liquid crystal display device of Example 1 is as follows. In the case of providing the respective openings 15 shown in FIG. 2A. Ph was fixed to 0.126 mm, L was fixed to 0.15 mm, and S was fixed to 0.007 mm, respectively, and Pv was set to either 0.036 mm, 0.053 mm, or 0.071 mm. Moreover, in the case of providing the respective openings 15 shown in FIG. 2B. S was fixed to 0.007 mm, and the combination of P and L was set to the three patterns of 0.053 mm and 0.065 mm, 0.071 mm and 0.09 mm, and 0.106 mm and 0.14 mm.

Rubbing treatment was performed to the respective alignment films 13, 14, and the first substrate 1 and the second substrate 2 were overlapped so that the rubbing direction would become anti-parallel. The alignment direction of the liquid crystal molecules at the substantial center of the liquid crystal layer 3 was set to the 12 o'clock direction as shown in FIG. 2A to FIG. 2D. As the liquid crystal material in the liquid crystal layer 3, a liquid crystal material in which $\Delta n$ (delta n) is substantially 0.21, and $\Delta \in$ (delta epsilon) is negative was used. The pretilt angle of the liquid crystal layer 3 was set to substantially 89.9°. Moreover, for comparison, a conventional liquid crystal display that is structured the same as Example 1 other than the openings not being provided to either the first electrode or the second electrode was also prepared. Voltage was applied between the first electrode 11 and the second electrode 12 by multiplex driving of 1/64 duty, 1/9 bias and frame inverted waveform to both the liquid crystal display device of Example 1 and the conventional one. Note that the applied voltage was defined constant on light display state.

Figure 3A:
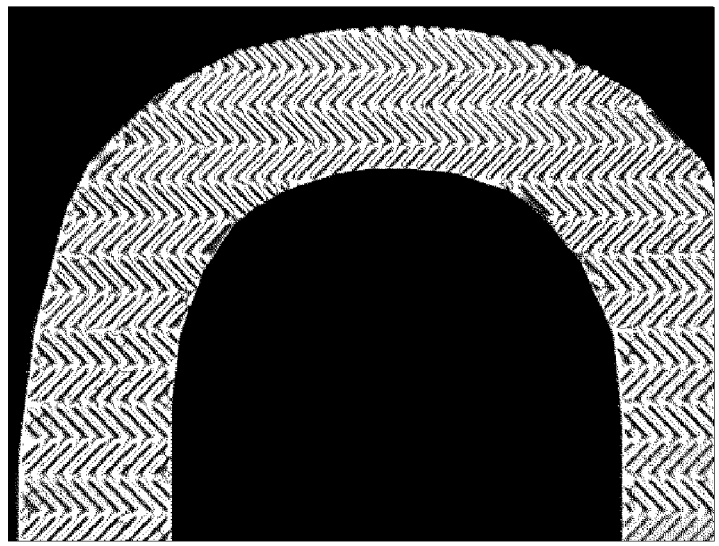
FIG. 3A and FIG. 3B are photos showing a microscopic texture of the display parts of the liquid crystal display device of Example 1.
Figure 3B:
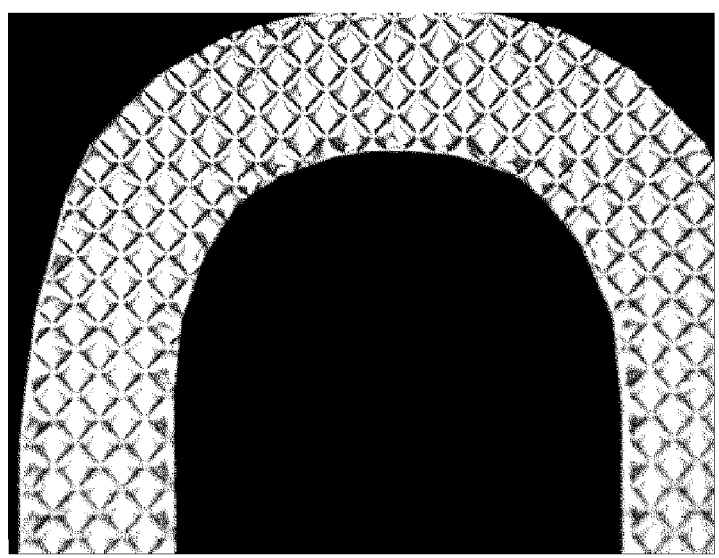

FIG. 3A and FIG. 3B are photos showing a microscopic texture of the display parts of the liquid crystal display device of Example 1. Specifically FIG. 3A is an texture of the liquid crystal display device provided with the openings 15 in the mode shown in foregoing FIG. 2A (setting value of Pv is 0.053 mm). FIG. 3B is a texture of the liquid crystal display device provided with the openings in the mode shown in foregoing FIG. 2B (setting value of P is 0.071 mm, and setting value of L is 0.09 mm). Note that in both cases the frame frequency is 100 Hz. In the texture of FIG. 3A, dark regions are observed in the respective openings 15 and the periphery thereof, but the pattern has regularity. Moreover, in the texture of FIG. 3B, random dark regions of the generation pattern can be observed around certain openings 15, but on the whole, the generation pattern of the dark region has regularity.

Figures 4A, 4B:
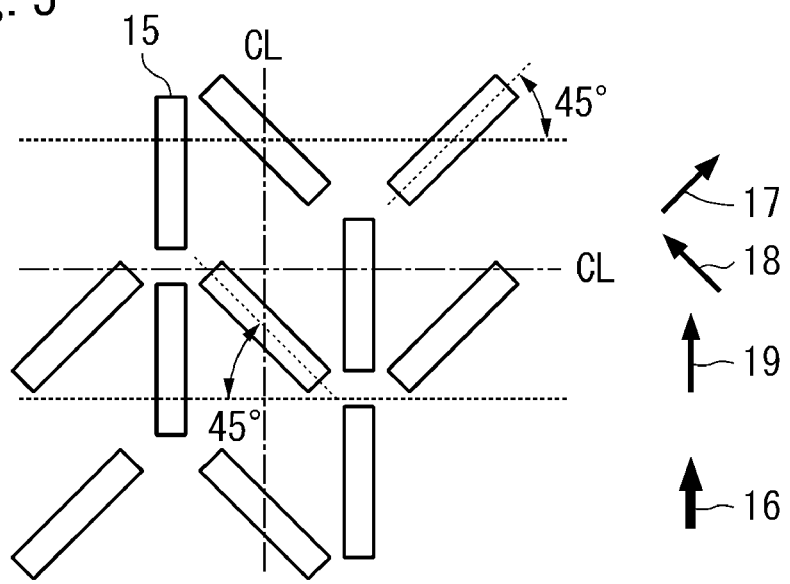
FIG. 4A and FIG. 4B are diagrams showing the results upon measuring the lower limit of the frame frequency in which the display uniformity of the segment display parts can be obtained based on the external observation of the liquid crystal display device of Example 1.

FIG. 4A and FIG. 4B are diagrams showing the results upon measuring the lower limit of the frame frequency in which the display uniformity of the segment display parts can be obtained based on the appearance observation of the liquid crystal display device of Example 1. Specifically, the Pv value dependency of the measurement results of the liquid crystal display device having the openings 15 in the mode shown in FIG. 2A is shown in FIG. 4A, and the P, L value dependency of the measurement results of the liquid crystal display device having the openings 15 in the mode shown in FIG. 2B is shown in FIG. 4B. In both liquid crystal display devices having the openings 15 of either mode, the dependency of the openings relative to the shape parameter is small, but the lower limit of frame frequency capable of obtaining the alignment uniformity has decreased considerably in comparison to the conventional liquid crystal display device that does not have the openings. Incidentally, the lower limit of frame frequency needed to be 250 Hz or higher in order to realize the display uniformity in the conventional liquid crystal display device that does not have the openings. Accordingly, it is considered that the significant effect of dropping the lower limit of frame frequency of the liquid crystal display device can be achieved by providing a plurality of openings 15 of the respective modes.

Note that, in the foregoing liquid crystal display device, the longitudinal direction of the openings faces the two directions of the first direction 17 and the second direction 18, and the angle that is formed by the respective directions; namely, the first direction 17 and the second direction 18, and the alignment direction 16 of the liquid crystal molecules at substantially center of the liquid crystal layer 3 is set to substantially 45° but these are not limited thereto. The angle that is formed by the respective directions; namely, the first direction 17 and the second direction 18, and the alignment direction 16 of the liquid crystal molecules at substantially center of the liquid crystal layer 3 will suffice so as long as it is 0° or more and less than 90°, and the first direction 17 and the second direction 18 do not have to be symmetrical horizontally or symmetrical vertically. Furthermore, as shown in FIG. 5, it is also effective to additionally provide an opening (third opening) in which its longitudinal direction faces a third direction 19, which is different from the first direction 17 and the second direction 18, in addition to the first direction 17 and the second direction 18 in which the longitudinal direction (long side) faces substantially ±45° relative to the alignment direction 17 of the liquid crystal molecules at substantially center of the liquid crystal layer 3.

Example 2

In the foregoing liquid crystal display device shown in FIG. 1, prepared was a liquid crystal display device in which the size of one pixel is 0.42 mm square and the gap between the stripe-shaped electrodes is 0.03 mm in a dot matrix electrode structure where the first electrode 11 and the second electrode 12 are formed in a stripe shape and crisscrossed. In addition, a liquid crystal display device having the segment display-type electrode structure shown in Example 1 was also prepared.

The first electrode 11 was provided with a plurality of cross-shaped openings 15 shown in foregoing FIG. 2C in the pixel. With the respective openings 15, the center of gravity thereof was respectively disposed in a checkered shape relative to the vertical/horizontal direction of the liquid crystal display device. In Example 2, since the respective openings 15 were provided to the first electrode 11 of the first substrate 1 irrelevant to the arrangement of the dot matrix pixels, the arrangement relationship of the openings in the respective pixel is not equal. Needless to say, the openings 15 may also be arranged in the respective pixels so that they are arranged equally. In the case of a segment display type liquid crystal display device, the respective openings are preferably arranged on one electrode in one display part, but if there are a plurality of display parts, it is not necessary to provide openings to the same electrode in all display parts.

The size of the respective openings 15 of the actually prepared liquid crystal display device was as follows. Specifically, S=0.007 mm and Ls=0.0114 mm were fixed, and the two patterns of L=0.0628 mm and P=0.1 mm, and L=0.137 mm and P=0.2 mm were set.

Rubbing treatment was performed to the respective alignment films 13, 14, and the first substrate 1 and the second substrate 2 were overlapped so that the rubbing direction would become anti-parallel. The alignment direction of the liquid crystal molecules at substantially center of the liquid crystal layer 3 was set to the 12 o'clock direction as shown in FIG. 2C. As the liquid crystal material configuring the liquid crystal layer 3, a liquid crystal material in which Δn (delta n) is substantially 0.21, and Δ∈ (delta epsilon) is negative was used. The pretilt angle of the liquid crystal layer 3 was set as two types; namely substantially 89.9° and 89.7°. Moreover, for comparison, a conventional liquid crystal display that is structured the same as Example 2 other than the openings not being provided to either the first electrode or the second electrode was also prepared. Voltage was applied between the first electrode 11 and the second electrode 12 by multiplex driving of 1/64 duty, 1/9 bias or 1/7 bias, and frame inverted waveform to both the liquid crystal display device of Example 2 and the conventional liquid crystal display device. Note that the applied voltage during the drive was constant at light, display state.

Figures 6, 7:
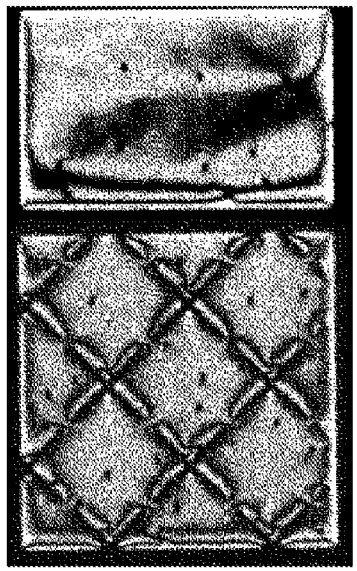
FIG. 6 is a photo showing a microscopic texture of the pixel parts of the liquid crystal display device having the dot matrix electrode structure of Example 2.
FIG. 7 is a diagram showing the results upon measuring the lower limit of the frame frequency in which the uniformity of the display parts can be obtained based on the appearance observation of the dot matrix-type and segment display-type liquid crystal display device of Example 2.

FIG. 6 is a photo showing a microscopic texture of the pixel parts of the liquid crystal display device having the dot matrix electrode structure of Example 2. Note that the texture also shows a part of the adjacent pixel to which the openings are not provided. The size of the respective openings 15 was set as follows; namely, L=0.0628 mm, Ls=0.0114 mm, S=0.007 mm, and P=0.1 mm. The pretilt angle of the liquid crystal layer 3 was 89.7°, and the driving conditions were frame frequency of 130 Hz and 1/9 bias. As shown in the photo, although dark regions are observed in the openings 15 and their peripheral as well as near the pixel edge in the pixels containing the respective openings 15, the pattern thereof is regular. Meanwhile, in the pixel (upper pixel in the photo) to which the openings are not provided, the dark regions are generated randomly and in a large area, and the display non-uniformity was clearly observed.

FIG. 7 is a diagram showing the results upon measuring the lower limit of the frame frequency in which the uniformity of the display parts can be obtained based on the appearance observation of the dot matrix-type and segment display-type liquid crystal display device of Example 2. As the parameters, bias values, pretilt angle and arrangement pitch P of the openings are shown. As the overall tendency, the lower limit of the frame frequency tends to be lower when the pretilt angle is small and the bias ratio is small. Moreover, in a dot matrix-type, the lower limit of the frame frequency can be lowered if the arrangement pitch P of the openings is greater, but the opposite tendency is observed in a segment display-type. In both cases, it was confirmed that the lower limit of the frame frequency can be lowered in comparison to the conventional liquid crystal display device that does not have any openings.

Figure 8:
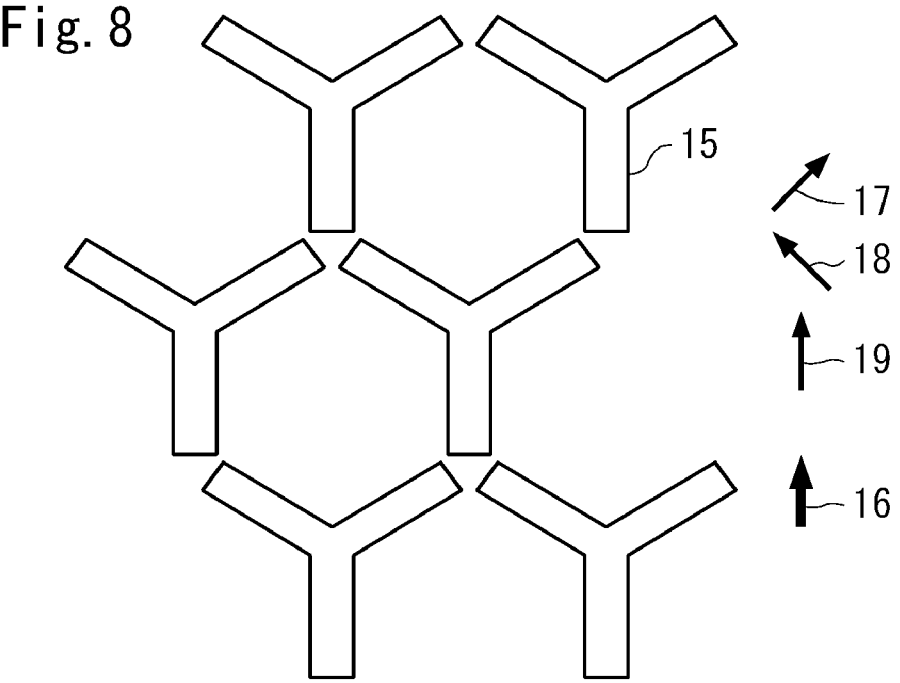
FIG. 8 is another schematic plan view explaining the structure of the respective openings provided to the first electrode.

Note that, in the foregoing liquid crystal display device, openings 15 having a cross-shaped outer edge including a rectangular first portion in which its longitudinal direction faces the first direction 17 and a rectangular second portion in which its longitudinal direction faces the second direction 18 were envisioned, and the case of crisscrossing the first portion and the second portion at substantially 90° was assumed, but the configuration is not limited thereto. The intersecting angle of the first portion and the second portion may be 0° or more and less than 90°. In addition, as shown in FIG. 8, it is also possible to lower the lower limit of the frame frequency by arranging, with regularity (for example, in a checkered pattern), the openings 15 having a Y-shaped outer edge by adding a rectangular third portion in which its longitudinal direction faces a third direction 19 in addition to the first portion and the second portion in the pixel in planar view. In the foregoing case, with respect to the three directions of the first direction to the third direction, the mutual angle between the respective two directions is ideally 120°, but it is not limited thereto. Moreover, although the three angles do not have to be equal, the mutual angle between two adjacent directions is preferably 0° or more and less than 360°.

Example 3

In the foregoing liquid crystal display device shown in FIG. 1, prepared was a liquid crystal display device having a segment display-type electrode structure as with Example 1. The first electrode 11 of the first substrate 1 (common substrate) was provided with the respective cross-shaped openings 15 shown in foregoing FIG. 21) in the pixel. With the respective openings 15, the center of gravity thereof was respectively disposed in a checkered shape relative to the vertical/horizontal directions in planar view. Note that, as with the case of Example 1, the respective openings are arranged on one electrode in the display parts, but it is not necessary to provide openings to the same electrode in all display parts, and the openings can also be arranged on one or the other electrode for each display part.

The size of the openings of the liquid crystal display device of Example 3 was set as follows. Specifically, S was fixed to 0.007 mm and L was fixed to P−0.025 mm, and P was set to two types; namely, 0.1 mm or 0.15 mm.

Rubbing treatment was performed to the respective alignment films 13, 14, and the first substrate 1 and the second substrate 2 were overlapped so that the rubbing direction would become anti-parallel. The alignment direction of the liquid crystal molecules at substantially center of the liquid crystal layer 3 was set to the 12 o'clock direction as shown in FIG. 2A to FIG. 2D. As the liquid crystal material configuring the liquid crystal layer 3, a liquid crystal material in which $\Delta n$ (delta n) is substantially 0.21, and $\Delta \in$ (delta epsilon) is negative was used. The pretilt angle of the liquid crystal layer 3 was set to substantially 89.9°. Voltage was applied between the first electrode 11 and the second electrode 12 by multiplex driving of $\frac{1}{64}$ duty $\frac{1}{9}$ bias and frame inverted waveform to the liquid crystal display device prepared as described above. Note that the applied voltage during the drive was constant at light display state.

Figure 9:
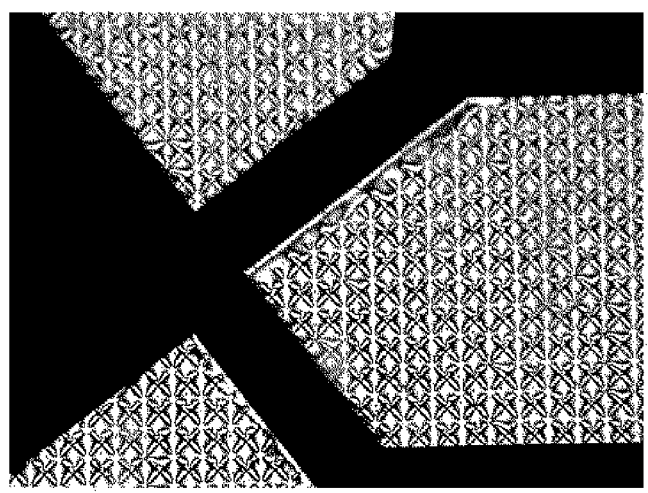
FIG. 9 is a photo showing a microscopic texture of the pixel parts of the liquid crystal display device having the segment display-type electrode structure of Example 3.

FIG. 9 is a photo showing a microscopic texture of the pixel parts of the liquid crystal display device having the segment display-type electrode structure of Example 3. This texture shows a case where P was set to 0.15 mm, and the frame frequency was set to 250 Hz. As shown in the photo, although the dark regions are observed in the respective openings 15 and their periphery the alignment texture is uniform. The lower limit of the frame frequency in which the display uniformity can be maintained in the appearance observation of the liquid crystal display device where P is set to 0.1 mm and P is set to 0.1.5 mm is basically the same as 190 Hz and 180 Hz, respectively, and it was confirmed that the frame frequency can be lowered in comparison to the conventional liquid crystal display device that are not provided with openings.

Figure 10:
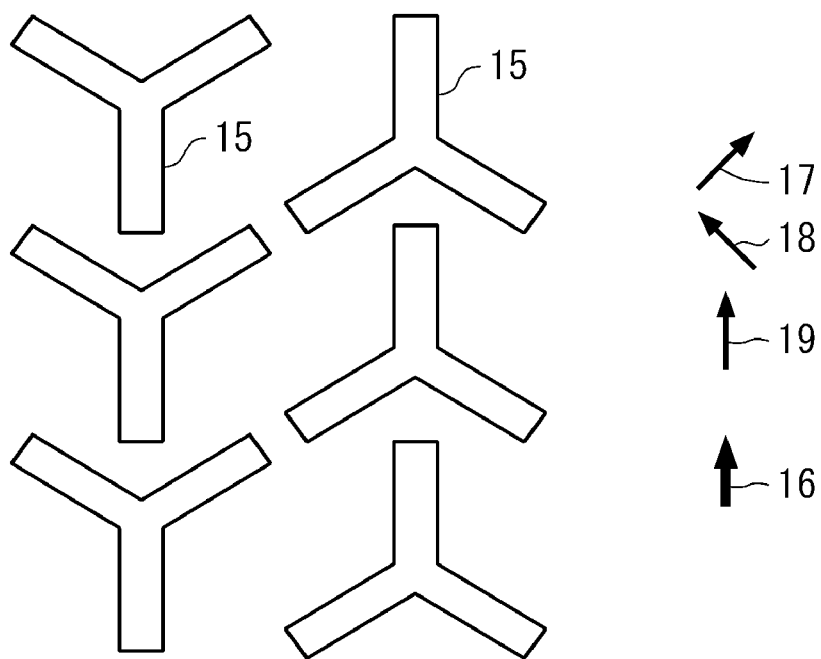
FIG. 10 is another schematic plan view explaining the structure of the respective openings provided to the first electrode.

Note that, in the foregoing liquid crystal display device of Example 8, openings 15 having a cross-shaped outer edge including a rectangular first portion in which its longitudinal direction faces the first direction 17 and a rectangular second portion in which its longitudinal direction faces the second direction 18 were envisioned, and the case of crisscrossing the first portion and the second portion at substantially 90° was assumed, but the configuration is not limited thereto. The intersecting angle may be 0° or more and less than 90°. In addition, as shown in FIG. 10, it is also possible to lower the lower limit of the frame frequency by arranging, with regularity, the openings 15 having a Y-shaped (and reverse Y-shaped) outer edge by adding a rectangular third portion in which its longitudinal direction faces a third direction 19 in addition to the first portion and the second portion in the pixel in planar view. In the foregoing case, with respect to the three directions of the first direction to the third direction, the mutual angle between the respective two directions is ideally 120°, but it is not limited thereto. Moreover, although the three angles do not have to be equal, the mutual angle between two adjacent directions is preferably 0° or more and less than 360°.

Example 4

In the liquid crystal display device having the same structure as foregoing Example 3, the case of adding a chiral material to the liquid crystal layer 3 in order to cause the twisted structure of the liquid crystal layer 3 when voltage is applied thereto is now explained.

Figure 11:
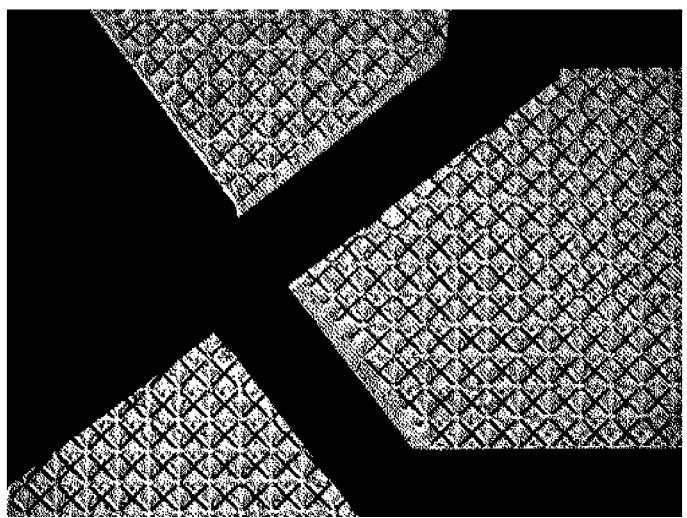
FIG. 11 is a photo showing a microscopic texture in the pixel parts of the liquid crystal display device of Example 4.

FIG. 11 is a photo showing a microscopic texture in the pixel parts of the liquid crystal display device of Example 4. This texture is the alignment texture in the case of driving, by multiplex driving, the liquid crystal display device with dip of 0.7 where the layer thickness of the liquid crystal layer 3 is d and the chiral pitch based on the chiral material added to the liquid crystal material is p, and setting P to 0.15 mm. The driving conditions were $\frac{1}{128}$ duty, $\frac{1}{10}$ bias, and frame inverted waveform having a frame frequency of 250 Hz to achieve a light display state of the driving voltage so that a maximum contrast could be obtained. Note that the pretilt angle of the liquid crystal layer was set to substantially 89.9°.

As shown in FIG. 11, the alignment texture of the liquid crystal display device of Example 4 has considerably fewer dark regions around the respective openings in comparison to the alignment texture (refer to FIG. 9) of the liquid crystal display device of Example 3, and it can be seen that a more uniform aligned state has been obtained. In terms of appearance also, it has been confirmed that display uniformity that is equal to or greater than the liquid crystal display device of Example 3, in which the chiral material was not added, could be obtained. Moreover, the lower limit of the frame frequency capable of obtaining the display uniformity is basically equal to Example 3, and the effect of lowering the frame frequency in comparison to the conventional liquid crystal display device that is not provided with openings has been confirmed. Note that, by adding a chiral material to the liquid crystal layer 3 in order to cause twisted structure of the liquid crystal layer 3 when voltage is applied thereto, it is considered that the occurrence of dark regions near the openings can also be inhibited and the display uniformity can be further improved even in the respective liquid crystal display devices of foregoing Example 1 and Example 2.

Although the alignment direction 16 of the liquid crystal molecules at the substantial center of the liquid crystal layer 3 during the non-application of voltage in the respective Examples was set, to the 12 o'clock direction, the alignment direction is not limited thereto. However, the alignment, direction needs to be controlled so that the respective longitudinal directions (long side edges) of the openings 15 and the alignment direction 16 of the liquid crystal molecules at substantially center of the liquid crystal layer 3 do not become substantially orthogonal.

Moreover, it is also possible to divide the display region of the liquid crystal display device into a plurality of regions, and cause the shape parameters of the respective openings to differ or cause the shapes thereof to differ in the respective display parts in the respective divided regions or the segment-type display. Similarly, with respect to the respective pixels of the liquid crystal display device, it is possible to divide one pixel into a plurality of regions, and cause the shape parameters of the respective openings to differ or cause the shapes thereof to differ in the respective divided regions.

(Effects According to Differences in Shape of Openings)

Differences in the effects according to the differences in the shape of the openings 15 are now explained from a theoretical perspective.

Figure 15:
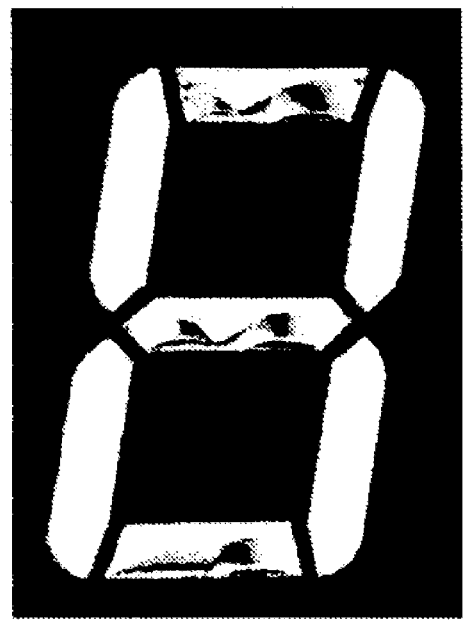
FIG. 15 shows an appearance observational photograph in the case of driving a vertical alignment liquid crystal display device having a pretilt angle of 89.6° by multiplex driving under the following conditions; namely, duty ratio of 1/8, bias ratio of 1/5, and frame frequency of 80 Hz.

As shown in FIG. 15 described above, when the edge (side) of a direction that is orthogonal to the alignment direction (corresponds to the rubbing direction) of the liquid crystal molecules at the center of the liquid crystal layer is long, dark regions appear near such edge, and the display uniformity (display quality) will deteriorate. Near this edge, the director of the liquid crystal molecules will rotate 180° since the rubbing direction on the substrate surface and the direction that the liquid crystal molecules are alignment controlled by the oblique electric field that is generated when voltage is applied to the liquid crystal layer differ by 180°. It is considered that the alignment of the liquid crystal molecules becomes non-uniform due to factors such as the rotating direction not being regular, and a dark region is consequently generated, causing the display uniformity to deteriorate. Moreover, it is considered that the dark regions are generated in a broader area depending on the shape of the electrodes.

Accordingly, it is considered that devising the structure of the electrode so that this kind of edge is shortened as much as possible would be effective. Based on this concept, it is considered that providing the various openings described above to one electrode would be effective. Specifically it will suffice so as long as there are numerous edges disposed at an angle that is smaller than orthogonal relative to the alignment direction of the liquid crystal molecules at substantially center of the liquid crystal layer 3.

Meanwhile, another effect of disposing the openings 15 on an electrode is that a local voltage non-application region surrounded by the openings 15 is formed when voltage is applied between the first electrode 11 and the second electrode 12, and this voltage non-application region is considered to function as a barrier that prevents the alignment, defects from spreading to a wide area. In fact, dependency on the applied voltage has been observed in the alignment non-uniformity and the tendency where alignment defects do not occur as the inclination angle of the liquid crystal molecules is closer to 90° has been observed. The foregoing phenomenon is now explained in detail with reference to FIG. 12A and FIG. 12B.

Figure 12A:
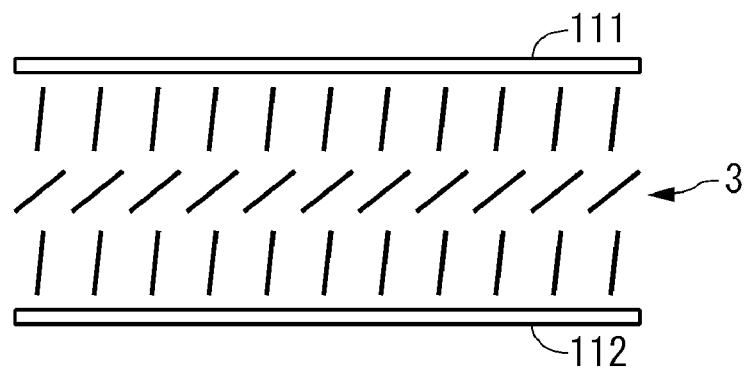
FIG. 12A and FIG. 12B are schematic views showing the electrodes and the liquid crystal molecules in the liquid crystal layer.

FIG. 12A schematically shows the electrodes that are not provided with the openings 15 and the liquid crystal molecules in the liquid crystal layer. Here, let it be assumed that a vertical alignment film is formed in each of the upper and lower electrodes 111, 112, and by performing rubbing treatment thereto, the alignment treatment is performed in anti-parallel in the horizontal direction on the plane of paper. When voltage is applied between the electrodes 111, 112, it is considered that the liquid crystal molecules are uniformly reoriented horizontally around near the center of the liquid crystal layer 3 as shown in the diagram. Nevertheless, if a non-uniform alignment occurs in the in-plane direction relative to the substrate surface such as near the edge of the electrode, such non-uniform alignment will propagate to the regions that are reoriented in horizontal alignment, and display defects will occur in a broad area.

Figure 12B:
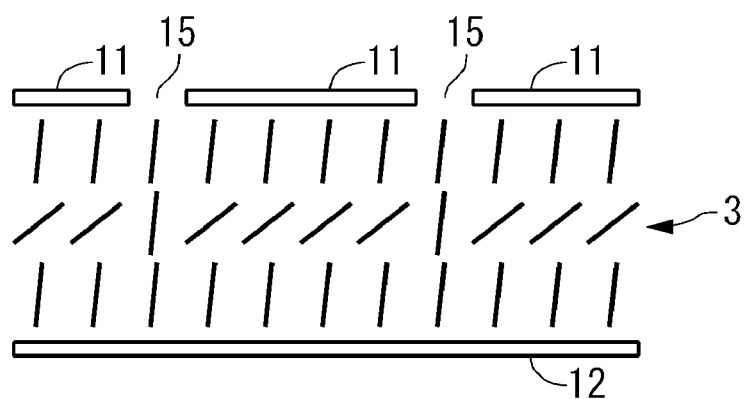

FIG. 12B schematically shows the electrodes provided with the openings and the liquid crystal molecules in the liquid crystal layer. Here, let it be assumed that a vertical alignment film is formed in each of the first electrode 11 and the second electrode 12, and by performing rubbing treatment thereto, the alignment treatment is performed in anti-parallel in the horizontal direction on the plane of paper. Moreover, a plurality of openings 15 are provided with regularity only to the first electrode 11. When adopting the illustrated configuration, it is possible to maintain the partial vertical alignment of the liquid crystal molecules of the liquid crystal layer 3 in correspondence with the arrangement of the openings 15. As a result of locally surrounding the liquid crystal layer 3 with the foregoing region maintaining the vertically aligned state, for instance, even if an non-uniform alignment were to occur, it is possible to block such region from its periphery and prevent it from propagating to the outside. This condition is schematically shown in FIG. 13A and FIG. 13B. As shown in the schematic perspective view of FIG. 13A and the schematic plan view of FIG. 13B, the liquid crystal molecules are maintained in a vertically aligned state at the portions of the respective openings 15. Based on this kind of principle, it is considered that the alignment uniformity of the liquid crystal layer 3 can be maintained and the display uniformity can be ensured by providing openings to the electrode. Note that the optimal viewing angle direction in the foregoing case is dependent on the rubbing direction, and a plurality of alignment domains will never occur.

The same applies to the case of using the cross-shaped opening 15 in which two rectangular openings are criss-crossed. This condition is schematically shown in FIG. 14. When the cross-shaped openings 15 are provided, as shown in the diagram, the effect of locally surrounding the liquid crystal layer 3 with the region maintaining the vertically aligned state can be obtained more strongly. Consequently, even if a non-uniform alignment was to occur, it is possible to block such region from its periphery and prevent it from propagating to the outside. The alignment uniformity can be further improved if the longitudinal directions of the cross-shaped openings 15 are not orthogonal relative to the rubbing direction. Accordingly, for example, as shown in FIG. 14, it is considered that disposing the longitudinal directions of the openings 15 to have an angle of substantially 45° relative to the rubbing direction would be effective. Even in the foregoing case, the optimal viewing angle direction is dependent on the rubbing direction, and a plurality of alignment domains will never occur. Note that similar effects can be obtained with the Y-shaped openings 15.

Note that this invention is not limited to the subject matter of the foregoing embodiments, and can be implemented by being variously modified within the scope of the gist of the present invention.

What is claimed is:

1. A liquid crystal display device, comprising:
a first substrate including a first electrode on one surface side;
a second substrate including a second electrode on one surface side and placed opposite to the first substrate; and
a liquid crystal layer having a pretilt angle set to 89.7° or more and less than 90°, and disposed between the first electrode of the first substrate and the second electrode of the second substrate,
wherein the first electrode and the second electrode respectively form a pixel in opposing areas,
wherein the first electrode includes a plurality of openings of a rectangular shape disposed with regularity in the pixel in a planar view,
wherein the plurality of openings include a first opening in which its longitudinal direction faces a first direction, and a second opening in which its longitudinal direction faces a second direction that is different from the first direction, and
wherein an angle formed by the respective longitudinal directions of the first opening and the second opening, and an alignment direction of liquid crystal molecules at substantially center of the liquid crystal layer is 0° or more and less than 90°.

2. The liquid crystal display device according to claim 1, wherein the plurality of openings further include a third opening in which direction and the second direction, and
wherein an angle formed by the longitudinal direction of the third opening, and an alignment direction of liquid crystal molecules at substantially center of the liquid crystal layer is 0° or more and less than 90°.

3. The liquid crystal display device according to claim 2, wherein a chiral material is added to the liquid crystal layer.

4. The liquid crystal display device according to claim 1, wherein a chiral material is added to the liquid crystal layer.

5. A liquid crystal display device, comprising:
a first substrate including a first electrode on one surface side;
a second substrate including a second electrode on one surface side and placed opposite to the first substrate; and
a liquid crystal layer having a pretilt angle set to 89.7° or more and less than 90°, and disposed between the first electrode of the first substrate and the second electrode of the second substrate,
wherein the first electrode and the second electrode respectively form a pixel in opposing areas,
wherein the first electrode includes a plurality of openings disposed with regularity in the pixel in a planar view,
wherein each of the plurality of openings has a cross-shaped outer edge including a rectangular first portion in which its longitudinal direction faces a first direction, and a rectangular second portion in which its longitudinal direction faces a second direction that is different from the first direction, and
wherein an angle formed by the respective longitudinal directions of the first portion and the second portion, and an alignment direction of liquid crystal molecules at substantially center of the liquid crystal layer is 0° or more and less than 90°.

6. The liquid crystal display device according to claim 5, wherein a chiral material is added to the liquid crystal layer.

7. A liquid crystal display device, comprising:
a first substrate including a first electrode on one surface side;
a second substrate including a second electrode on one surface side and placed opposite to the first substrate; and
a liquid crystal layer having a pretilt angle set to 89.7° or more and less than 90°, and disposed between the first electrode of the first substrate and the second electrode of the second substrate,
wherein the first electrode and the second electrode respectively form a pixel in opposing areas,
wherein the first electrode includes a plurality of openings disposed with regularity in the pixel in a planar view,
wherein each of the plurality of openings has a Y-shaped outer edge including a rectangular first portion in which its longitudinal direction faces a first direction, a rectangular second portion in which its longitudinal direction faces a second direction that is different from the first direction, and a rectangular third portion in which its longitudinal direction faces a third direction that is different from both the first direction and the second direction, and
wherein an angle formed by the respective longitudinal directions of the first portion, the second portion and the third portion, and an alignment direction of liquid crystal molecules at substantially center of the liquid crystal layer is 0° or more and less than 90°.

8. The liquid crystal display device according to claim 7, wherein a chiral material is added to the liquid crystal layer.

* * * * *